(12) United States Patent
Tian et al.

(10) Patent No.: US 9,288,817 B2
(45) Date of Patent: Mar. 15, 2016

(54) METHOD AND SYSTEM FOR COORDINATED SCHEDULING BASED ON CELL PRIORITY

(75) Inventors: Kaibo Tian, Shenzhen (CN); Nan Zhao, Shenzhen (CN); Aihua Peng, Shenzhen (CN); Jing Jiang, Shenzhen (CN); Dong Zhou, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 827 days.

(21) Appl. No.: 13/509,798

(22) PCT Filed: Dec. 10, 2010

(86) PCT No.: PCT/CN2010/079657
§ 371 (c)(1),
(2), (4) Date: May 15, 2012

(87) PCT Pub. No.: WO2011/069468
PCT Pub. Date: Jun. 16, 2011

(65) Prior Publication Data
US 2012/0238283 A1    Sep. 20, 2012

(30) Foreign Application Priority Data

Dec. 11, 2009 (CN) .......................... 2009 1 0254334

(51) Int. Cl.
*H04W 72/10* (2009.01)
*H04W 4/00* (2009.01)
*H04W 24/10* (2009.01)

(52) U.S. Cl.
CPC ................ *H04W 72/10* (2013.01); *H04W 4/00* (2013.01); *H04W 24/10* (2013.01)

(58) Field of Classification Search
CPC .............. H04W 72/10; H04W 72/087; H04W 72/0426; H04W 72/082

USPC ............... 455/423, 450, 452.1; 370/311, 335, 370/339, 230, 236.1, 312, 328, 329, 338
See application file for complete search history.

(56) References Cited

U.S. PATENT DOCUMENTS 7,747,221 B2    6/2010  Lee
8,619,563 B2 *  12/2013  Madan ................. H04L 5/0037
                                                   370/230

(Continued)

FOREIGN PATENT DOCUMENTS

CN        101442808 A      5/2009
CN        101478342 A      7/2009

(Continued)

OTHER PUBLICATIONS

PCT International Search Report Dated Mar. 17, 2011, Applicant ZTE Corporation, Application No. PCT/CN2010/079657.

(Continued)

*Primary Examiner* — Khawar Iqbal
(74) *Attorney, Agent, or Firm* — Brooks Kushman P.C.

(57) ABSTRACT

The present invention discloses a method and system for coordinated scheduling based on cell priority, which is applied to the system using coordinated multiple point (CoMP) transmission technology. The method includes: performing priority sequencing on each coordinated cell according to the historical and/or current information of each coordinated cell and finishing scheduling of each coordinated cell in an order according to priority from high to low. By adopting the coordinated scheduling scheme in the present invention, the network can be made in a reasonable working status, and then, the performance of the entire system can be improved.

6 Claims, 2 Drawing Sheets

(56) References Cited

U.S. PATENT DOCUMENTS

| | | | |
|---|---|---|---|
| 8,737,310 B2* | 5/2014 | Hui et al. ................. 370/328 |
| 8,750,152 B2* | 6/2014 | Koo ..................... H04B 7/024 |
| | | | 370/252 |
| 2009/0268684 A1* | 10/2009 | Lott et al. ................. 370/329 |
| 2010/0041407 A1* | 2/2010 | Caire ................... H04W 16/28 |
| | | | 455/446 |
| 2010/0056171 A1* | 3/2010 | Ramprashad ......... H04W 16/10 |
| | | | 455/452.1 |
| 2010/0195527 A1* | 8/2010 | Gorokhov ........... H04B 7/0417 |
| | | | 370/252 |
| 2010/0317355 A1* | 12/2010 | Zangi .................... H04L 1/0001 |
| | | | 455/450 |
| 2011/0039547 A1* | 2/2011 | van Rensburg ... H04W 72/1252 |
| | | | 455/423 |
| 2011/0045831 A1* | 2/2011 | Chiu ................... H04W 72/082 |
| | | | 455/436 |
| 2012/0082058 A1* | 4/2012 | Gerstenberger .. H04W 36/0083 |
| | | | 370/252 |
| 2012/0083261 A1* | 4/2012 | Hui ....................... H04W 48/10 |
| | | | 455/422.1 |
| 2015/0003416 A1* | 1/2015 | Chung ................ H04J 11/0093 |
| | | | 370/331 |
| 2015/0009853 A1* | 1/2015 | Wan .................. H04W 72/1289 |
| | | | 370/252 |

FOREIGN PATENT DOCUMENTS

| | | |
|---|---|---|
| CN | 101516112 A | 8/2009 |
| EP | 2101460 A2 | 9/2009 |
| WO | 2006011337 A1 | 2/2006 |

OTHER PUBLICATIONS

3GPP TST RAN WG1 Meeting #59, R1-094806 PA12-222 Reference 1, Jeju, Korea, Nov. 9-13, 2009, Source: Potevio, Title: "Considerations on CoMP Switching and Scenarios", Agenda Item: 7.5.3, Document for: Discussion, 4 Pages.

Japanese Office Action Dated Sep. 10, 2013, Application No. 2012-538186, PA12-222, 594741, 3 Pages.

* cited by examiner

METHOD AND SYSTEM FOR COORDINATED SCHEDULING BASED ON CELL PRIORITY

CROSS-REFERENCE TO RELATED APPLICATIONS

This application is a U.S. national phase of PCT Application No. PCT/CN2010/079657 filed Dec. 10, 2010 which claims priority to Chinese Application No. 200910254334.0 filed Dec. 11, 2009, the disclosures of which are incorporated in their entirety by reference herein.

TECHNICAL FIELD

The present invention relates to the field of mobile communication technology, and in particular, to a method and system for coordinated scheduling based on cell priority.

BACKGROUND OF THE RELATED ART

In order to increase the coverage rate of the high-speed data rate service and improve the cell edge and cell average throughput rate, the coordinated multiple point transmission and reception (CoMP) technology is introduced into the long term evolution-advanced (LTE-A) system.

The CoMP technology in the LTE-A is mainly divided into: 1), joint transmission technology, each node in the coordinated transmission set can obtain data information, and the physical downlink shared channel (PDSCH) data are transmitted through a plurality of nodes or one node at the same moment; 2), coordinated scheduling, only the serving cell can obtain the data information to be transmitted, scheduling the user and confirmation of the wave beam shaping are completed through the negotiation in the coordinated set.

At present, there are the following problems in the existing coordinated scheduling scheme of coordinated cell:
1. when scheduling one coordinated cell, only the characteristic of the present coordinated cell is considered, so it may cause strong interference to other coordinated cell which has already completed the scheduling in the coordinated area;
2, when scheduling the user in the coordinated cell, it does not consider the fair principle and the resource utilization rate is low.

SUMMARY OF THE INVENTION

The technical problem that the present invention requires to solve is to provide a method and system for coordinated scheduling, which fully considers the characteristic of each coordinated cell and optimizes the resources allocation in the whole coordinated area.

In order to solve the above-mentioned problem, the present invention provides a method for coordinated scheduling based on cell priority, which is applied to a system using coordinated multiple point transmission (CoMP) technology, comprising:
performing priority sequencing on each coordinated cell according to historical and/or current information of each coordinated cell; and
successively finishing scheduling of each coordinated cell in an order according to priority from high to low.

The step of successively finishing scheduling of each coordinated cell in an order according to priority from high to low comprises: after finishing scheduling of a high priority coordinated cell, performing scheduling on a low priority coordinated cell according to a scheduling result of the high priority coordinated cell;
the scheduling result comprises: scheduling user information, and weight information of the scheduling user.

The step of successively finishing scheduling of each coordinated cell in an order according to priority from high to low further comprises: when scheduling one coordinated cell, according to channel feedback information of each user to be scheduled and finished data throughput of each user to be scheduled in that coordinated cell, preferentially selecting a user to be scheduled whose finished data throughput is little and current channel quality is high to perform the scheduling.

The step of performing scheduling on a low priority coordinated cell according to a scheduling result of the high priority coordinated cell comprises:
when scheduling the coordinated cell, if interference of a user to be scheduled to a user for which scheduling is already finished is beyond a preset interference strength threshold value, then giving up scheduling the user.

The historical information comprises one or any combination of following information: service volume, business intensity and type of served service of the present coordinated cell;
the current information comprises one or any combination of following information: number of the user to be scheduled, current channel status information and data type of the user in the present coordinated cell.

When scheduling the coordinated cell, if the coordinated cell supports a multi-user multiple input multiple output (MU-MIMO) multiple antenna mode, and channel condition allows, a plurality of users to be scheduled in the coordinated cell are scheduled; if the coordinated cell supports a single-user multiple input multiple output (SU-MIMO) mode, and under the case that the channel condition allows, a plurality of flows are used for the users to be scheduled which are scheduled by the coordinated cell.

When the method is applied in a centralized coordinated network, the step of successively finishing scheduling of each coordinated cell in an order according to priority from high to low comprises: taking any coordinated cell or one coordinated cell confirmed according to service volume or business status in each coordinated cell in the network as a central control cell, which finishes the scheduling of each coordinated cell, and sends the scheduling result to each coordinated cell respectively;
when the method is applied in a distributed coordinated network, the method further comprises: each coordinated cell sending the historical and current information of the present cell to all other coordinated cells, and meanwhile, each coordinated cell also receiving the historical and current information of the cell sent by other coordinated cells; the step of performing priority sequencing on each coordinated cell according to historical and/or current information of each coordinated cell comprises: each coordinated cell performing the priority sequencing according to the historical and/or relevant information of all coordinated cells; the step of successively finishing scheduling of each coordinated cell in an order according to priority from high to low comprises: a high priority coordinated cell, after finishing the scheduling, notifying all low priority coordinated cells of the scheduling result; and the low priority cell receiving the scheduling result sent by the high priority cell.

The method further comprises:
performing the priority sequencing to each coordinated cell again at each coordinated moment or according to a preset cycle.

The present invention further provides a system for coordinated scheduling based on cell priority, comprising an information receiving and sending module, a priority sequencing module and a cell scheduling module, wherein, the information receiving and sending module is configured to send or receive historical and current information of a coordinated cell;

the priority sequencing module is configured to perform priority sequencing on each coordinated cell according to the historical and/or the current information of each coordinated cell;

the cell scheduling module is configured to successively finish the scheduling of each coordinated cell in an order according to priority from high to low. The present invention further provides a system for coordinated scheduling based on cell priority, applied in a centralized coordinated network, comprising a base station which comprises a central control cell and a base station of other coordinated cells, wherein, the base station of other coordinated cells comprises:

a first information receiving and sending module, configured to send historical and current information of the present coordinated cell, and relevant information of a user to be scheduled in the present coordinated cell to the central control cell; and receive the scheduling result sent by the central control base station;

the base station in the central control cell comprises:

a second information receiving and sending module, configured to receive the historical and current information of each coordinated cell, and the relevant information of the user to be scheduled in each coordinated cell; and send a scheduling result to each coordinated cell respectively;

a priority sequencing module, configured to perform priority sequencing on each coordinated cell according to the historical and/or the current information of each coordinated cell; and a cell scheduling module, configured to schedule a corresponding coordinated cell according to the relevant information of the user to be scheduled in each coordinated cell. The central control cell is any coordinated cell in the centralized coordinated network, or one coordinated cell confirmed according to service volume or business status in each coordinated cell in the network.

The present invention further provides a system for coordinated scheduling based on cell priority, applied in a distributed coordinated network, comprising a base station in each coordinated cell in the network, wherein, the base station comprises:

an information receiving and sending module, configured to send historical and current information of the present coordinated cell to all other coordinated cells; receive historical information and current information of the cell, and a scheduling result of a high priority coordinated cell sent by other coordinated cells; and notify a scheduling result of the present coordinated cell to all low priority coordinated cells;

the priority sequencing module, configured to perform priority sequencing on each coordinated cell according to historical and/or current information of each coordinated cell; and the cell scheduling module, configured to finish the scheduling of the present coordinated cell according to the scheduling result of the high priority cell and relevant information of a user to be scheduled in the present coordinated cell.

Adopting the coordinated scheduling scheme in the present inventing, it can fully consider the characteristic of each coordinated cell, and optimize the resources allocation of the whole area, and schedule the user by giving consideration to the proportion fair principle at the same time when scheduling the user in each cell, which makes the network in a reasonable working status, and then it is able to improve the performance of the entire system.

PREFERRED EMBODIMENTS OF THE PRESENT INVENTION

Figure 1:
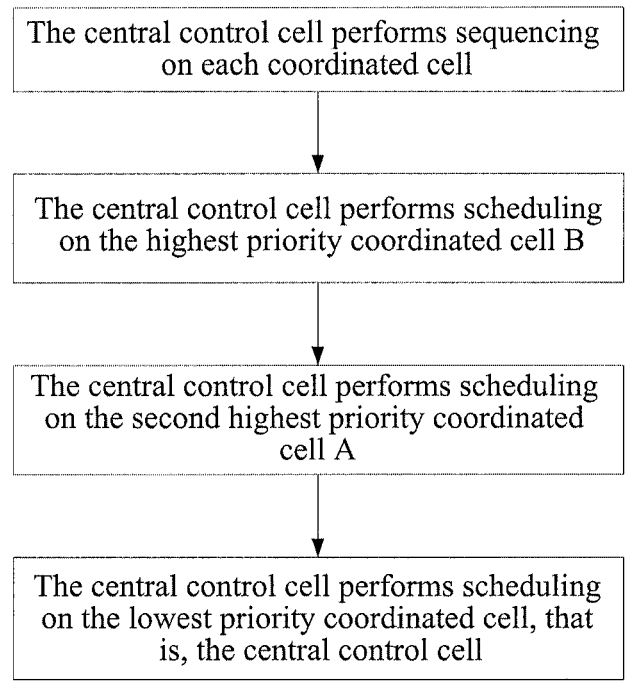
FIG. 1 is a flow chart of a method for coordinated scheduling in a centralized coordinated network according to an example of the present invention.

In the CoMP technology of the LTE-A, there are several coordinated cells in one coordinated area, and each coordinated cell can support the multi-user multiple input multiple output (MU-MIMO) and the single-user multiple input multiple output (SU-MIMO) multiple antenna modes. The user in each coordinated cell measures the channel quality from itself to the located serving cell independently, and feeds back the measure information to the located serving cell.

The core idea of the present invention is: to confirm the priority of each coordinated cell according to the historical and current relevant information of each coordinated cell, and finish the scheduling successively in an order according to priority from high to low; and consider the scheduling result of the high priority cell when scheduling the low priority cell.

Based on the above-mentioned idea, the method for coordinated scheduling provided by the present invention includes the following contents:

A. Sequencing the cell priority

The priority sequencing to each coordinated cell can be performed according to the historical and/or current information of each coordinated cell. Depending on difference of the specific application scenario, the historical information includes but not limited to one or any combination of the following information: the information, such as, service volume, business intensity and the type of served service, etc., of the present cell computed before this moment; the current information includes but not limited to one or any combination of the following information: the information, such as, the number of the users that the present cell will serve soon (that is, the users need to transmit data, called the user to be scheduled hereinafter), the current channel status information, the data type of the user, etc. From the computed historical information, if the service volume of the cell is usually relatively great, that is, the cell is a service busier cell, meanwhile, if the current quantity of the users to be served is large, the requirement of the real-time feature of the user data is high, and the channel condition of the user is good, then the priority of the present cell will be high.

B. Sequencing mode

The priority sequencing can adopt the dynamic mode and also can adopt the half static mode. The dynamic mode means that the priority sequencing is performed again at each coordinated moment; the half static mode means that the priority sequencing is performed periodically, that is, it does not update the priority order in a certain coordinated time interval, and the priority of each coordinated cell is updated according to the historical information and the current information if exceeding that interval.

C. When scheduling a certain coordinated cell, the following information needs to be considered: the scheduling information of a higher priority cell and the relevant information of the user to be scheduled.

Wherein, considering the scheduling information of the higher priority cell is to reduce the interference on them, for example, if it is found that scheduling any user in the present coordinated cell will form the strong interference to the coordinated cell scheduling for which is already finished, the judgment of the strong interference can be realized by setting the interference strength threshold, then the present coordinated cell will not schedule the user of the present coordinated cell on that coordinated time-frequency resource.

Considering the relevant information of the user to be scheduled is to give consideration to the fairness principle and improve the resource utilization rate.

D. Preferably, if a certain coordinated cell supports the MU-MIMO multiple antenna mode, and under the case that the channel condition allows, that coordinated cell can schedule a plurality of users in the present coordinated cell. Likewise, if the coordinated cell supports the SU-MIMO mode, and under the case that the channel condition allows, the user that the present coordinated cell can schedule can use a plurality of flows.

While if the coordinated cell does not support the MU-MIMO multiple antenna mode, or the channel condition does not allow to schedule the multi-user or multi-flow, then it also can schedule a single user.

The present invention can apply to a centralized coordinated network or a distributed coordinated network. The centralized coordinated network refers to that there is one central control point (cell) in the coordinated area, and the entire scheduling process is totally finished by the central control point; the distributed coordinated network refers to that in the coordinated area, each coordinated cell finishes cell priority sequencing alone according to the historical and current relevant information of each coordinated cell respectively (since the information obtained by each coordinated cell is totally the same, the sequencing result obtained by all each cell is also identical). Wherein, each coordinated cell can obtain the information of other coordinated cells through the way of pairwise interaction between the coordinated cells; also it can be that each coordinated cell sends the historical and current information of the present cell to all the other coordinated cells, and meanwhile, receives the historical and current information of the cell sent by other coordinated cells. The high priority cell, after finishing the scheduling, notifies all low priority cells of the scheduling result including the scheduling user information (that is, which users are scheduled) and the weight information used by the each user being scheduled (called as the confirmed scheduling hereinafter), etc., and the low priority cells receive the scheduling result sent by the high priority cell and perform the scheduling of the present cell according to the scheduling result of the high priority cell.

Example One

The implementation of the technical scheme of the present invention is further described in detail by taking the centralized coordinated network for instance hereinafter.

Assuming that there are 3 coordinated cells in the area, called as coordinated cell A, coordinated cell B and coordinated cell C. Each coordinated cell supports the MU-MIMO and the SU-MIMO modes, and there are 3 users to be scheduled in the coordinated resource of each coordinated cell. The users to be scheduled of the coordinated cell A are: user a1, user a2 and user a3; the users to be scheduled of the coordinated cell B are: user b1, user b2 and user b3; and the users to be scheduled of the coordinated cell C are: user c1, user c2 and user c3.

One interference strength threshold is set (the interference strength threshold can be set by each coordinated cell uniformly, and also can be set respectively); when scheduling a user to be scheduled, if the interference of the user to be scheduled to the user confirmed scheduling is greater than the threshold, then the scheduling for the user is given up. Specifically, the interference of the user to be scheduled to the user confirmed scheduling can be confirmed according to the leaked energy.

The 3 users to be scheduled in the coordinated cell A, the user a1, the user a2 and the user a3, measure the channel quality from the cell itself to the base station of the coordinated cell A independently, and feeds back the measure information to the coordinated cell A; the 3 users to be scheduled in the coordinated cell B, the user b1, the user b2 and the user b3, measure the channel quality from themselves to the base station of the coordinated cell B independently, and feeds back the measure information to the coordinated cell B; the 3 users to be scheduled in the coordinated cell C, the user c1, the user c2 and the user c3, measure the channel quality from themselves to the base station of the coordinated cell C independently, and feeds back the measure information to the coordinated cell C.

Assuming that, in view of the statistics result, the service volume of the coordinated cell C is minimum, or the current business status of the coordinated cell C is the lowest, then the coordinated cell C is selected as the central control cell.

The coordinated cell A sends the relevant information of the 3 users to be scheduled in the present cell and the relevant information of the present cell to the central control cell. The relevant information of the users to be scheduled includes the information, such as, the channel feedback information of the users to be scheduled and the data throughput already finished by the users to be scheduled within a certain time period, etc.; the cell relevant information of the coordinated cell A, in the present embodiment, the cell relevant information mainly includes the information, such as, the current cell business intensity and the type of service to be served soon, etc.

Similarly, the coordinated cell B sends the relevant information of the 3 users to be scheduled in the present cell and the relevant information of the present cell to the central control cell. The relevant information of the user to be scheduled includes the information, such as, the channel feedback information of the users to be scheduled and the data throughput already finished by the users to be scheduled within a certain time period (that time period can be set and adjusted according to actual requirement), etc.; the cell relevant information of the coordinated cell B includes the information, such as, the current cell business intensity and the type of service to be served soon, etc.

As shown in FIG. 1, the method for coordinated scheduling mainly includes the following steps.

In the first step, the central control cell C confirms the priority of each coordinated cell according to the cell relevant information of each coordinated cell at first. The confirmation principle is that the busier the coordinated cell is, the higher its grade is, that is, the higher the real-time feature of the service to be served soon is, the larger the data volume is, the higher the grade is. Assuming that, according to that principle, the final cell priorities in an order according priority from high to low are: coordinated cell B, coordinated cell A and coordinated cell C. After the grade is confirmed, the scheduling of each coordinated cell is successively confirmed according to the grade order hereinafter.

In the second step, the scheduling to the highest priority cell that is the coordinated cell B is performed. The central control cell C finishes the scheduling of the present cell by considering two respect of factors, the proportion fair principle and the current channel quality, according to the information of the 3 users to be scheduled in the cell transmitted by the coordinated cell B. If the throughput that the user to be scheduled finishes already is little and the current channel quality is high, that user will be scheduled in priority. Assuming that the final confirmed scheduling users are two users b1 and b2, each user only launches one flow that is, each user has only one best weight value.

In the third step, the scheduling to the second highest priority cell that is the coordinated cell A is performed. The central control cell C performs the scheduling of the present cell by adopting the maximum signal leak ratio criterion except considering two respect of factors, the proportion fair principle and the current channel quality of the user to be scheduled, according to the information of the 3 users to be scheduled in the cell transmitted by the coordinated cell A and the scheduling judgment result of the higher priority cell. For example, the transmitted signal energy is s, and the energy leaked to other users is L, and the maximum signal leak ratio criterion is that ratio s/L is expected to be maximum. In that process it is found that, when any one of the 3 users a1, a2 and a3 is scheduled, its interference to the confirmed scheduling user exceeds the specified interference strength threshold, so the final scheduling result is that the coordinated cell A does not schedule the user in the coordinated resource.

In the fourth step, the scheduling to the lowest priority cell that is the central control cell C is performed. The central control cell C performs the scheduling of the present cell by adopting the maximum signal leak ratio criterion except considering two respect of factors, the proportion fair principle and the current channel quality of the user to be scheduled, according to the information of the 3 users to be scheduled in the present cell and the scheduling judgment result of the higher priority cell, that is, the scheduling result of the cell B and cell A. It is assumed that the channel condition does not support two users to coexist, which is caused by the channel condition of the present cell, and the present cell can only schedule one user at the same time and confirm finally to schedule the user c2.

So far the scheduling of 3 cells is finished, and the central control cell sends the scheduling result to the corresponding coordinated cell respectively.

Figure 2:
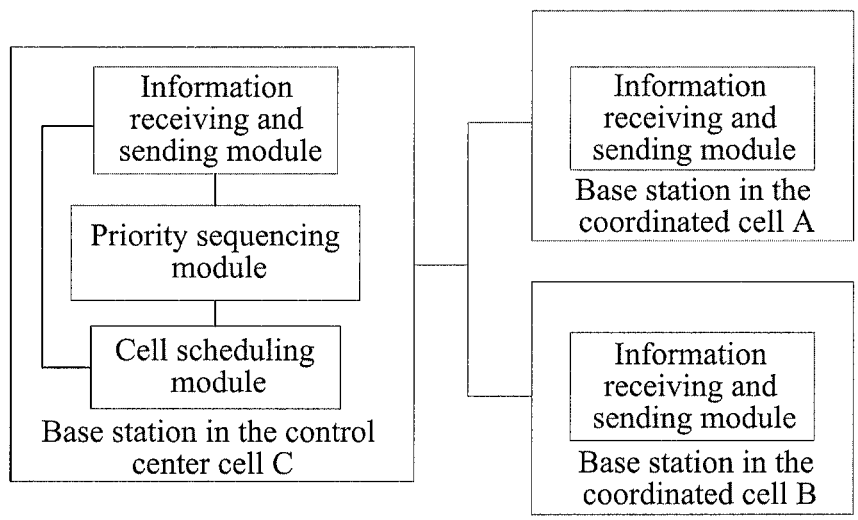
FIG. 2 is a block diagram of a system for coordinated scheduling applied in a centralized coordinated network according to an example of the present invention.

In addition, as shown in FIG. 2, the example of the present invention provides a system for coordinated scheduling based on cell priority, applied in a centralized coordinated network, and the network includes a central control cell and other coordinated cells, wherein, the base station in other coordinated cells includes:
an information receiving and sending module, configured to send historical and current information of the present coordinated cell, and relevant information of a user to be scheduled in the present coordinated cell to the central control cell; and receive the scheduling result sent by the central control base station;

the base station in the central control cell includes:
an information receiving and sending module, configured to receive the historical and current information of each coordinated cell, and the relevant information of the user to be scheduled in each coordinated cell; and send the scheduling result to each coordinated cell respectively;
a priority sequencing module, configured to perform priority sequencing on each coordinated cell according to the historical and/or the current information of each coordinated cell; and
a cell scheduling module, configured to schedule a corresponding coordinated cell according to the relevant information of the user to be scheduled in each coordinated cell.

Wherein, the central control cell is any coordinated cell in the centralized coordinated network, or one coordinated cell confirmed according to service volume or business status in each coordinated cell in the network.

Example Two

The example of the technical scheme of the present invention is further described in detail by taking the distributed coordinated network for instance hereinafter.

Assuming that there are 3 coordinated cells in the area, and each coordinated cell supports the MU-MIMO and the SU-MIMO modes, and there are 3 users to be scheduled in the coordinated resource of each coordinated cell. The coordinated cells are called as coordinated cell A, coordinated cell B and coordinated cell C. The users to be scheduled of the coordinated cell A are called as: user a1, user a2 and user a3; the users to be scheduled of the coordinated cell B are called as: user b1, user b2 and user b3; and the users to be scheduled of the coordinated cell C are called as: user c1, user c2 and user c3.

One interference threshold is set, and when the user to be scheduled is scheduled, if the interference of the user to be scheduled to the user confirmed scheduling is greater than the threshold, then it gives up to schedule that user.

The 3 users to be scheduled in the coordinated cell A, the user a1, the user a2 and the user a3, measure the channel quality from the cell itself to the base station of the coordinated cell A independently, and feeds back the measure information to the coordinated cell A; the 3 users to be scheduled in the coordinated cell B, the user b1, the user b2 and the user b3, measure the channel quality from themselves to the base station of the coordinated cell B independently, and feeds back the measure information to the coordinated cell B; the 3 users to be scheduled in the coordinated cell C, the user c1, the user c2 and the user c3, measure the channel quality from themselves to the base station of the coordinated cell C independently, and feeds back the measure information to the coordinated cell C.

Three coordinated cells send its own relevant information to all other coordinated cells respectively, and the cell relevant information includes the information, such as, the current cell business intensity, the type of service to be served soon, etc. Each coordinated cell uses the information of the present cell and the received information sent by other coordinated cells to perform the priority sequencing respectively according to the set cell priority algorithm. Since the information and the priority algorithm used by each cell are entirely same, so the priority acquired by the three coordinated cells are same. To confirm the priority of each coordinated cell, the confirmation principle is that the busier the coordinated cell is, the higher its grade is, and the higher the real-time feature of the service to be served soon is and the larger the data volume is, the higher the grade is. Assuming that, according to that principle, the final cell priorities in descending order successively are: coordinated cell B, coordinated cell A and coordinated cell C.

After each coordinated cell acquires the cell priority, the high priority coordinated cell performs the scheduling at first, and the low priority cell, after waiting for the schedule result of the high priority cell, starts to schedule.

The scheduling to the highest priority cell that is the coordinated cell B is firstly made, and the coordinated cell A and the coordinated cell C wait for the scheduling result of the coordinated cell B. The coordinated cell B finishes the scheduling of the present cell by considering two respect of factors, the proportion fair principle and the current channel quality; if the throughput that the user to be scheduled finishes already is little and the current channel quality is high, that user will be scheduled in priority. The final confirmed scheduling users are two users b1 and b2, each user only launches one flow that is, each user has only one best weight value, and this scheduling result indicates that the coordinated cell B adopts the MU-MIMO mode at the moment. The coordinated cell B sends the scheduling result to the coordinated cell A and coordinated cell C.

The coordinated cell C still waits after receiving the scheduling result of the coordinated cell B, because the grade of the coordinated cell A is higher than itself.

The coordinated cell A can perform scheduling to the present cell after receiving the scheduling result of the coordinated cell B, because currently the cell itself is of the highest grade of all unscheduled coordinated cells. The coordinated cell A performs the scheduling of the present cell by considering the proportion fair principle and the current channel quality of the user to be scheduled and the scheduling judgment result of the coordinated cell B and adopting the maximum signal leak ratio criterion. In that process it is found that, when any one of the 3 users a1, a2 and a3 is scheduled, its interference to the confirmed scheduling user exceeds the specified interference threshold, so the final scheduling result is that the coordinated cell A does not schedule the user in the coordinated resource; and the coordinated cell A notifies the scheduling result to the lower priority coordinated cell C.

The coordinated cell C can perform scheduling to the present cell after receiving the scheduling result of the coordinated cell A, because currently the cell C itself is of the highest grade of all unscheduled coordinated cells. The coordinated cell C performs the scheduling of the present cell by considering the proportion fair principle and the current channel quality of the user to be scheduled and the scheduling result of the coordinated cell A and the coordinated cell B and adopting the maximum signal leak ratio criterion. Caused by the channel condition of the present cell, the present cell can only schedule one user at the same time and confirm finally to schedule the user c2.

So far the scheduling of the 3 cells is finished, and each coordinated cell is performed the scheduling according to the scheduling result of the cell own.

Figure 3:
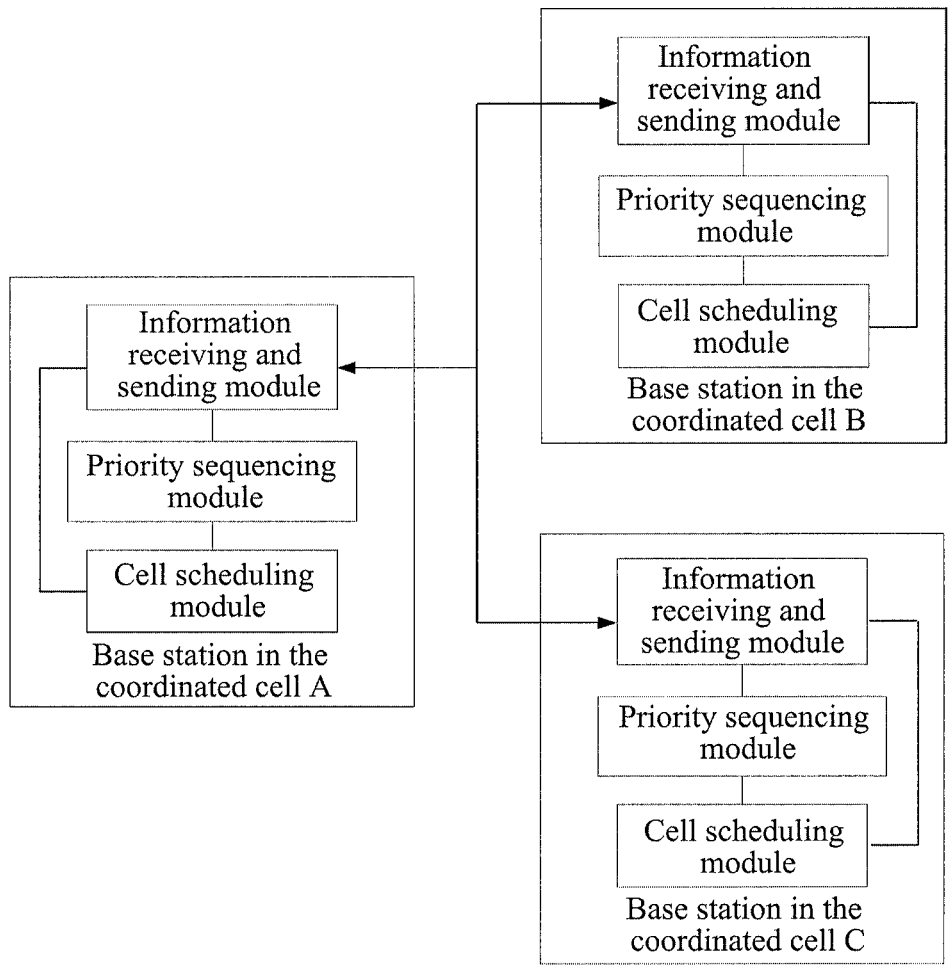
FIG. 3 is a block diagram of a system for coordinated scheduling applied in a distributed coordinated network according to an example of the present invention.

As shown in FIG. 3, the present also provides another system for coordinated scheduling based on cell priority, applied in a distributed coordinated network, and the base station in each coordinated cell in the network further comprises an information receiving and sending module, a priority sequencing module and a cell scheduling module, wherein, the information receiving and sending module is configured to send historical and current information of the present coordinated cell to all other coordinated cells; receive historical information and current information of the cell, and a scheduling result of a high priority coordinated cell sent by other coordinated cells; and notify a scheduling result of the present coordinated cell to all low priority coordinated cells;

the priority sequencing module is configured to perform priority sequencing on each coordinated cell according to the historical and/or the current information of each coordinated cell; and the cell scheduling module is configured to finish the scheduling of the present coordinated cell according to the scheduling result of the high priority cell and relevant information of the user to be scheduled in the present coordinated cell.

Although for the example objective, the preferable examples of the present invention are already disclosed, the skilled in the art will realize that various kinds of improvement, increase and displacement are possible, therefore, the above examples are not intended to limit the scope of the present invention.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned examples can be implemented with one or more integrated circuits. Accordingly, each module/unit in the above-mentioned examples can be implemented in the form of hardware, or in the form of software function module. The present invention is not limit to any specific form of the combination of the hardware and software.

INDUSTRIAL APPLICABILITY

Adopting the coordinated scheduling scheme in the present inventing, it can fully consider the characteristic of each coordinated cell, and optimize the resources allocation of the whole area, and schedule the user by giving consideration to the proportion fair principle at the same time when scheduling the user in each cell, which makes the network in a reasonable working status, and then it is able to improve the performance of the entire system.

What we claim is:

1. A method for coordinated scheduling based on cell priority, which is applied to a system using coordinated multiple point transmission (CoMP) technology, comprising:
   performing priority sequencing on each coordinated cell according to historical and/or current information of each coordinated cell; and
   successively finishing scheduling of each coordinated cell in an order according to priority from high to low;
   wherein,
      the historical information comprises one or any combination of following information: service volume, business intensity and type of served service of the present coordinated cell;
      the current information comprises one or any combination of following information: number of the user to be scheduled, current channel status information and data type of the user in the present coordinated cell;
   wherein,
      when the method is applied in a centralized coordinated network, the step of successively finishing scheduling of each coordinated cell in an order according to priority from high to low comprises taking any coordinated cell or one coordinated cell confirmed according to service volume or business status in each coordinated cell in the network as a central control cell, which finishes the scheduling of each coordinated cell, and sends the scheduling result to each coordinated cell respectively;

when the method is applied in a distributed coordinated network, the method further comprises each coordinated cell sending the historical and current information of the present cell to all other coordinated cells, and meanwhile, each coordinated cell also receiving the historical and current information of the cell sent by other coordinated cells;

the step of performing priority sequencing on each coordinated cell according to historical and/or current information of each coordinated cell comprises each coordinated cell performing the priority sequencing according to the historical and/or relevant information of all coordinated cells;

the step of successively finishing scheduling of each coordinated cell in an order according to priority from high to low comprises: a high priority coordinated cell, after finishing the scheduling, notifying all low priority coordinated cells of the scheduling result; and the low priority cell receiving the scheduling result sent by the high priority cell.

2. The method according to claim 1, wherein,
the step of successively finishing scheduling of each coordinated cell in an order according to priority from high to low comprises: after finishing scheduling of a high priority coordinated cell, performing scheduling on a low priority coordinated cell according to a scheduling result of the high priority coordinated cell; the scheduling result comprises: scheduling user information, and weight information of the scheduling user.

3. The method according to claim 2, wherein,
the step of successively finishing scheduling of each coordinated cell in an order according to priority from high to low further comprises: when scheduling one coordinated cell, according to channel feedback information of each user to be scheduled and finished data throughput of each user to be scheduled in that coordinated cell, preferentially selecting a user to be scheduled whose finished data throughput is little and current channel quality is high to perform the scheduling.

4. The method according to claim 2, wherein,
the step of performing scheduling on a low priority coordinated cell according to a scheduling result of the high priority coordinated cell comprises:
when scheduling the coordinated cell, if interference of a user to be scheduled to a user for which scheduling is already finished is beyond a preset interference strength threshold value, then giving up scheduling the user.

5. The method according to claim 1, wherein,
when scheduling the coordinated cell, if the coordinated cell supports a multi-user multiple input multiple output (MU-MIMO) multiple antenna mode, and channel condition allows, a plurality of users to be scheduled in the coordinated cell are scheduled; if the coordinated cell supports a single-user multiple input multiple output (SU-MIMO) mode, and under the case that the channel condition allows, a plurality of flows are used for the users to be scheduled which are scheduled by the coordinated cell.

6. The method according to claim 1, further comprising:
performing the priority sequencing to each coordinated cell again at each coordinated moment or according to a preset cycle.

* * * * *